UNITED STATES PATENT OFFICE.

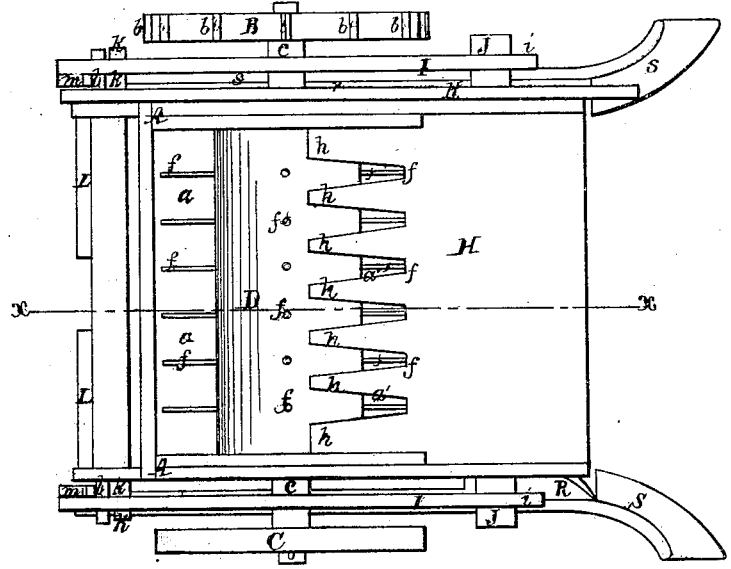
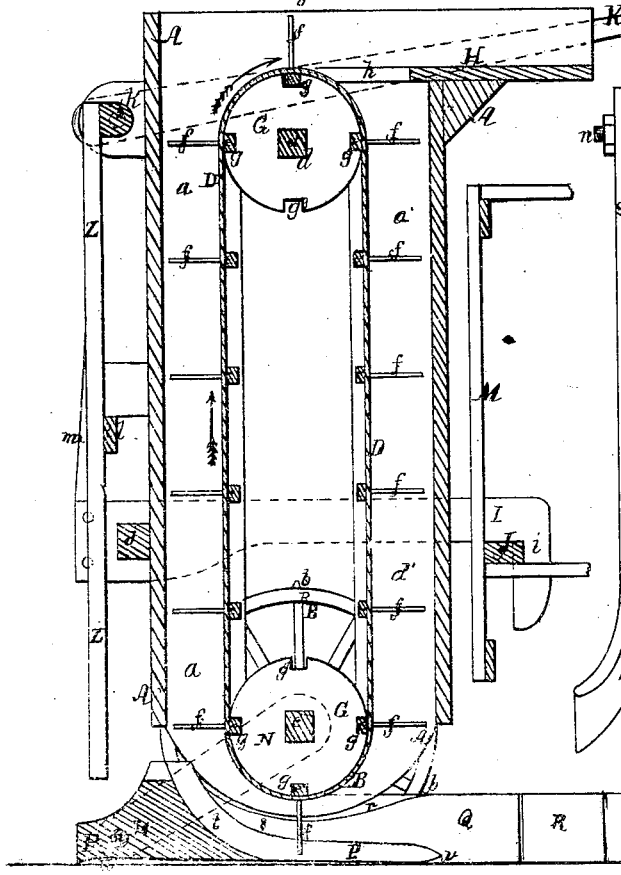
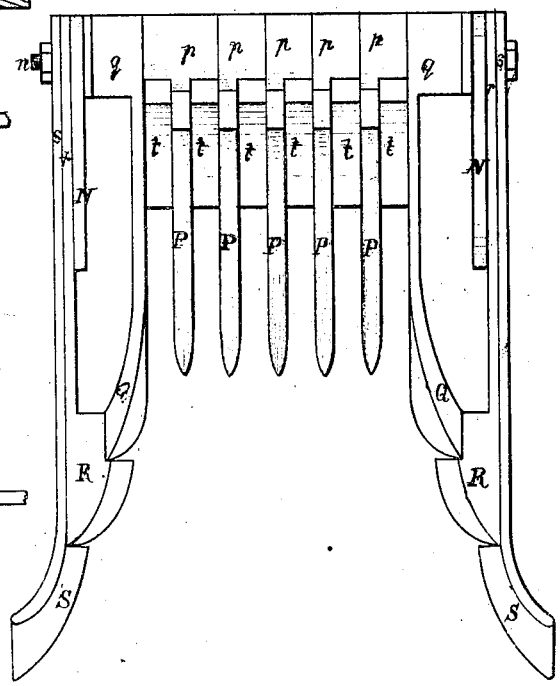
J. N. Smith,
Hay Loader.
No. 46863 — Patented Mar. 14, 1865.

NOTTINGHAM SMITH, OF JERSEY CITY, NEW JERSEY, ASSIGNOR TO HIMSELF AND JOHN A. PARTRAGE, OF SAME PLACE.

IMPROVEMENT IN MACHINES FOR RAKING AND LOADING HAY.

Specification forming part of Letters Patent No. 46,863, dated March 14, 1865.

*To all whom it may concern:*

Be it known that I, JOSEPH NOTTINGHAM SMITH, of Jersey City, in the county of Hudson and State of New Jersey, have invented a new and Improved Machine for Raking and Loading Hay; and I do hereby declare that the following is a full and exact description thereof, reference being had to the accompanying drawings, making part of this specification—

Figure 1 being a plan of the machine; Fig. 2, a vertical section thereof in a plane indicated by the line $x\ x$, Fig. 1; Fig. 3, a plan of the rake detached.

Like letters designate corresponding parts in all the figures.

The frame A of the elevator is mounted in a vertical position on a pair of wheels, B C, and the rake below is drawn by means of two draft-bars, N N, which are pivoted at the forward end on the axle $c$ of the supporting-wheels, and at the rear end on the shaft $n$ of the rake. The whole form and arrangement of the machine are best indicated by the drawings.

The machine is intended to be drawn by and immediately at the rear of the wagon or cart into and upon which the hay is to be loaded. To this end a suitable frame, M, Fig. 2, is secured at and to the rear end of the cart or wagon by bolts or otherwise in any convenient manner. A cross-beam, J, of this frame serves as a draft-bar, over which draft-hooks or dogs I I hook, whereby the machine is drawn along. These draft-hooks I I are pivoted at $j$, Fig. 1, to the rear side of the elevator-frame, so that they may be as long as possible, and allow of undulations of motion without disturbing the action of the machine, and they reach along by the two sides of the frame without being in contact therewith, and at a sufficient distance therefrom to allow a free movement of the machine over uneven ground. Behind the pivots $j\ j$ of these draft-bars they project somewhat, and from their extreme rear ends standards $m\ m$ extend upward, respectively. Just in front of the standards is situated the cross-bar $l$ of a swinging frame, or its equivalent, L, which is suspended by pivots $k\ k$ from the upper end of the elevator-frame A, and close behind it, reaching down within a short distance of the ground. A lever, K, is firmly secured and braced to the swinging frame at one side of the machine, and extends forward so that it can be readily reached by the person who makes the load on the wagon or cart. Thus the whole arrangement of the swinging frame and its lever is such that by depressing the front end of the lever the frame will be swung outward, and that moves the standards $m\ m$ of the draft-hooks backward, and consequently lifts the front ends of the draft-hooks upward and releases their hook projections $i\ i$ from the bar J of the frame M, thereby entirely disengaging the whole machine from the wagon or cart whenever desired; and the swinging frame L thus being swung backward, the machine, disengaged from the wagon or cart, leans in that direction, and is supported or braced up by said swinging frame resting on the ground, and is held upright ready to be again attached to the wagon or cart.

The rake lies upon the ground under the elevator-frame and reaches forward somewhat under the wagon or cart, substantially as indicated in the drawings. It is drawn by the rear ends of its teeth, which are separately pivoted on the draft-shaft $n$.

The outside teeth, S S, extend forward farther than any others, and their forward ends flare outward sidewise, so as to gather in the hay. Their extremities are sloped inward, somewhat on the principal of the mold-board of a plow, so as to gather the hay more toward the center. The next pair of teeth, R R, are shorter than the outer pair, and also slope inward at the front end with wide points, the extremities of which are shielded behind the widened points of the outer teeth, S S, substantially as shown in Fig. 3. The next pair of teeth, Q Q, are likewise shorter than the preceding, and have sloped and widened points shielded behind those of the preceding pair, R R, and thus the construction continues for as many pairs of teeth as desired, all together tending to gather the hay inward toward the center from a wider breadth than the elevator. In the middle there is a set of receiving and lifting teeth, P P P P P, shorter than the side teeth, Q R S, and with ordinary points. Toward the middle they rise or slope upward in a curve or arc of a circle, so as to lift the hay somewhat from the ground as it is moved backward under the elevator. As all the teeth are separately pivoted on their shaft $n$, they adapt themselves to all unevenness of the ground which they run closely upon. Their forward ends are kept close down to the ground by the draft-point being near the rear end, and by the peculiar shape of their under surfaces, they being a little concavely curved or hollowed in the middle, so as not to touch the ground there, but projecting downward somewhat at the extreme rear end, as seen at $u$, Fig. 2. The front extremities are rounded somewhat, as shown at $v$, so that they will not plow into the ground.

The elevator consists of a series of horizontal rake heads or bars, $e\ e\ e$, each provided with teeth $f\ f\ f$ at regular distances apart, and all attached to an endless apron or belt, D, which extends the whole width of the inclosing elevating passage of the frame A. The rake-heads $e\ e\ e$ are inside of the endless apron, and the teeth $f\ f\ f$ extend outward through it, so that a smooth surface is presented to the hay, allowing thereby a freer movement through the inclosed elevator-passage $a$, and permitting the stripping or separating teeth $h\ h$ to come very close to the apron, and thus better strip off the hay. This construction also allows the apron to be driven directly by the rake-heads $e\ e\ e$, and relieve the apron itself of undue strain. This endless apron, with its cross-heads $e\ e\ e$, fit around drum-heads or wheels G G G G, each two attached, respectively, to the axle $c$ of the driving and supporting wheels B C, and to a roller-shaft, $d$, in the upper part of the elevator-frame. There are simple notches $g\ g\ g$ in the peripheries of these wheels, into which the teeth-heads $e\ e\ e$ fit, and whereby the endless apron is moved. The revolving motion is transmitted to the endless apron by the axle $c$, one of the supporting-wheels, B, being secured immovably to the axle, so as to give the motion, and having spurs $b\ b\ b$ (if necessary) projecting from its periphery, so as to insure its turning on the ground. The other wheel, C, turns loosely on the axle to facilitate turning round with the machine. The endless apron moves round in the direction indicated by the arrows in Fig. 2, and its teeth, in coming down around the axle $c$ nearly to the ground, pass between the middle teeth, P P P P P, of the rake, their being spaces $t\ t\ t\ t\ t$, Figs. 2 and 3, cut away between their curved portions to allow this passage of the elevator-teeth. The elevator directly lifts and conveys the hay upward between the endless apron and the sides of the inclosed passage $a\ a$, and thence forward at the top, over the drum-shafts $d$, upon a delivering or discharging platform, H, from which the hay is pushed forward thereby into the wagon or cart. This platform has separating-teeth $h\ h$ at the rear edge, situated closely down over the curved form of the endless apron at that point, so that they strip the hay from the same, the teeth of the elevator passing down between the platform-teeth. The whole arrangement of the elevator is clearly shown in Fig. 2. Being vertical, or nearly so, it takes up but little room behind the wagon or cart. This inclosed passage $a$ is very advantageous and desirable, since it allows the hay to be loaded as well when the wind blows as when it is still, and by having the discharging-platform H protected by sides, as shown, the arrangement for the purpose is complete.

What I claim as my invention, and desire to secure by Letters Patent, is—

1. Pivoting the draft-hooks I I to the rear of the elevator-frame so as to produce the necessary length of the draft-line to insure freedom of motion, as set forth.

2. The swinging frame L with its lever K, whereby the draft-hooks may be detached from the wagon or cart and the elevator is retained and supported in its upright position after being detached, substantially as and for the purpose herein specified.

3. The construction and arrangement of the side rake-teeth, Q R S, substantially as and for the purposes herein specified.

4. The combination of the inwardly-gathering side rake-teeth, Q R S, and the elevating-teeth P P, constructed and arranged substantially as and for the purpose herein set forth.

5. The arrangement of the rake so as to be drawn flat on the ground by the freely-vibrating or double-pivoted draft-bars N N, drawing the rake-teeth by the rear ends thereof, substantially as herein set forth.

6. The concavely-curved under surfaces of the rake-teeth, together with the projecting heels $u\ u$ behind their pivot-shaft $n$, for the purpose set forth.

7. Constructing the elevator with its rake-heads $e\ e\ e$ inside of and its teeth $f\ f\ f$ projecting through the endless apron D, substantially as and for the purposes herein specified.

The above specification of my improved machine for raking and loading hay signed by me this 30th day of August, 1864.

JOSEPH NOTTINGHAM SMITH.

Witnesses:
T. C. EDWARDS,
E. SMITH.